(12) United States Patent
Nakayama et al.

(10) Patent No.: US 10,288,989 B2
(45) Date of Patent: May 14, 2019

(54) PROJECTOR AND PANEL FOR OPENING

(71) Applicant: SEIKO EPSON CORPORATION, Tokyo (JP)

(72) Inventors: Tetsu Nakayama, Matsumoto (JP); Ryoichi Nakagawa, Osaka (JP); Yoshitsugu Akutagawa, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/919,495

(22) Filed: Mar. 13, 2018

(65) Prior Publication Data
US 2018/0284581 A1    Oct. 4, 2018

(30) Foreign Application Priority Data
Mar. 28, 2017   (JP) .................................. 2017-063635

(51) Int. Cl.
*G03B 21/14*    (2006.01)
*G03B 21/16*    (2006.01)
(Continued)

(52) U.S. Cl.
CPC ........... *G03B 21/145* (2013.01); *G03B 21/16* (2013.01); *G03B 21/56* (2013.01); *G03B 21/005* (2013.01)

(58) Field of Classification Search
CPC ........ G03B 21/16; G03B 21/18; G03B 21/56; G03B 21/145; H04N 9/3141; H04N 9/3144
See application file for complete search history.

(56) References Cited

U.S. PATENT DOCUMENTS

| 2002/0021417 A1* | 2/2002 | Rodriguez, Jr. | ......... H04N 5/74 353/69 |
| 2004/0246447 A1* | 12/2004 | Shiraishi | ................ G03B 21/16 353/58 |

(Continued)

FOREIGN PATENT DOCUMENTS

| JP | 2001-350199 A | 12/2001 |
| JP | 2002-506536 A | 2/2002 |

(Continued)

OTHER PUBLICATIONS

VPL-SW630C (https://pro.sony/en_CA/products/short-throw-projectors/vpl-sw630c), 2014 Sony Corporation, 8 pp.

(Continued)

*Primary Examiner* — Sultan Chowdhury
(74) *Attorney, Agent, or Firm* — Oliff PLC

(57) ABSTRACT

A projector that projects an image on a screen includes a projection port for projecting the image in a direction tilting to the lower side with respect to the horizontal direction, a housing, and an exhaust panel provided in an exhaust port formed in the housing and configured to restrict a moving direction of the air discharged through the exhaust port. The exhaust port is formed on a right side surface toward a projecting direction of the image in the housing. The exhaust panel forms a channel that connects the inner side and the outer side of the housing. The channel has a tilt coming closer to a direction vertically opposite to the projecting direction of the image and closer to the screen from the inner side toward the outer side.

13 Claims, 13 Drawing Sheets

(51) Int. Cl.
*G03B 21/56* (2006.01)
*G03B 21/00* (2006.01)

(56) References Cited

U.S. PATENT DOCUMENTS

| | | | | |
|---|---|---|---|---|
| 2008/0252859 A1* | 10/2008 | Nagahata | ............... | G03B 21/16 |
| | | | | 353/61 |
| 2009/0268170 A1* | 10/2009 | Nakashita | .............. | G03B 21/16 |
| | | | | 353/61 |
| 2011/0279789 A1 | 11/2011 | Gishi et al. | | |
| 2014/0354958 A1* | 12/2014 | Tsuchitani | ............. | G03B 21/16 |
| | | | | 353/61 |

FOREIGN PATENT DOCUMENTS

| | | |
|---|---|---|
| JP | 2008-203450 A | 9/2008 |
| JP | 2011-242491 A | 12/2011 |
| WO | 99-00698 A1 | 1/1999 |

OTHER PUBLICATIONS

Sony Data Projector Operating Instruction, VPL-SW630C/SW620C/SW630/SW620, VPL-SX630 (https://pro.sony/s3/cms-static-content/uploadfile/19/1237492932919.pdf), 2014 Sony Corporation, 85 pp.

* cited by examiner

PROJECTOR AND PANEL FOR OPENING

BACKGROUND

1. Technical Field

The present invention relates to a projector and a panel for opening.

2. Related Art

In a projector, there has been known a configuration for suppressing the influence of exhaust air on a projected video (see, for example, JP-A-2011-242491 (Patent Literature 1)). In the configuration described in Patent Literature 1, an exhaust fan is covered with a cover including a louver. The air discharged by the exhaust fan passes through the louver to be discharged in a direction away from a projection surface.

However, in the configuration described in Patent Literature 1, for a user, the inside of a main body is sometimes seen between adjacent vane sections, which configure the louver, from the direction away from the projection surface. In this way, by using the cover including the louver, it is possible to obtain an effect of suppressing the influence of the exhaust air on the projected video. On the other hand, there is influence on the exterior of the projector.

SUMMARY

An advantage of some aspects of the invention is to make it possible to improve designability in a projector including a configuration for suppressing the influence of exhaust air on a projected video.

An aspect of the invention is directed to a projector that projects an image on a projection surface, the projector including: a projecting section configured to project the image in a direction tilting to an upper side or a lower side with respect to a horizontal direction; a housing; and a restricting section provided in an opening formed in the housing and configured to restrict a moving direction of air discharged or sucked through the opening. The opening is formed on a side surface on at least one of a left side and a right side in a projecting direction of the image in the housing. The restricting section forms a channel that connects an inner side and an outer side of the housing. The channel has a tilt that comes, from the inner side toward the outer side, closer to a direction vertically opposite to the projecting direction of the image and closer to the projection surface.

According to the aspect of the invention, it is possible to expect an effect that a restricting body blocks a line of sight viewing the inside of the housing from a direction different from the direction of the channel (the moving direction of the air). Therefore, the inside of the housing does not affect the exterior. It is possible to achieve improvement of designability. In the case of a configuration for discharging the air from the opening formed in the housing, by leading the air discharged from the inside of the housing to a direction in which the air does not overlap image light, it is possible to prevent the influence of the exhaust air on the projection image and satisfactorily keep visibility of the projection image. For example, when the projector is set above the projection surface and the image light is projected downward, the exhaust air is led toward the projection surface and upward.

In the configuration described above, the restricting section may include a plurality of tabular restricting bodies extending along an extending direction of the channel.

With this configuration, by arraying the plurality of tabular restricting bodies, it is possible to easily form the channel for leading the exhaust air.

In the configuration described above, thickness of the restricting body on the inner side of the housing and thickness of the restricting body on the outer side of the housing may be different.

With this configuration, when the restricting body is molded by a manufacturing method in which a mold is used, it is easy to release the restricting section by giving, to the restricting section, a draft angle due to the difference between the thicknesses of the restricting body on the inner side and the outer side of the housing.

In the configuration described above, the restricting section may include a restricting body, which is a hollow body in which a plurality of the channels having a tubular shape are arrayed.

With this configuration, it is possible to easily realize, with a small number of components, a configuration for leading the air discharged from the inside of the housing to a desired direction.

In the configuration described above, the restricting body may be disposed to cover the opening, the respective channels may be opened to one surface side and the other surface side of the restricting body, an opening ratio on one surface side of the restricting body may be different from an opening ratio on the other surface side.

With this configuration, by providing, on one surface side of the restricting body, a part where the channel is closed, when the restricting section is molded by the manufacturing method in which the mold is used, it is possible to provide a hollow in the mold to correspond to the part where the channel is closed. It is possible to fill resin in the mold using the hollow as a gate. Therefore, it is easier to manufacture the restricting section.

The restricting body may include a closing section opened on one surface side of the restricting body and closed on the other surface side.

With this configuration, when the restricting section is molded by the manufacturing method in which the mold is used, it is possible to use the closing section as a part against which an eject pin is pressed when the restricting section is released. It is easier to manufacture the restricting section.

In the configuration described above, the restricting body may include a honeycomb structure in which a plurality of the channels having a hexagonal shape in section are arrayed.

With this configuration, it is possible to easily form a large number of channels with the honeycomb structure. It is possible to easily secure the strength of the restricting body. Further, when the restricting section is molded by the manufacturing method in which the mold is used, the resin easily flow into the mold on a side where the restricting section is formed. Therefore, it is easy to constantly mold the hollow body, which forms the channel, at fixed thickness.

In the configuration described above, the restricting body may include a surface having opaqueness or a light blocking effect.

With this configuration, by providing, in the opening, the restricting body having opaqueness or a light blocking effect, it is possible to effectively reduce visibility of the inside of the housing through the restricting body. It is possible to improve the designability.

In the configuration described above, the restricting section may include a frame attached to the housing, and the restricting body may be fixed to the frame.

With this configuration, by using the frame, it is possible to easily dispose the restricting body that leads the exhaust air to a predetermined direction.

In the configuration described above, the restricting section may include the restricting body integrally formed on a side surface of the housing in which the opening is formed.

With this configuration, it is possible to reduce the number of components of the projector. It is possible to reduce man-hour during manufacturing of the projector.

In the configuration described above, the projector may include an exhaust device configured to discharge the air in the housing from the opening.

With this configuration, by using the exhaust device, it is possible to discharge the air on the inner side of the housing to the outer side through the restricting section.

Another aspect of the invention is directed to a panel for opening attached to an opening formed in a housing of a projector that projects an image on a projection surface. A projecting direction of the image is a direction tilting to an upper side or a lower side with respect to a horizontal direction. The opening is formed on aside surface on at least one of a right side and a left side in the projecting direction of the image in the housing. In a state in which the panel for opening is attached to the opening, the panel for opening forms a channel that connects an inner side and an outer side of the housing. The channel has a tilt that comes, from the inner side toward the outer side, closer to a direction vertically opposite to the projecting direction of the image and closer to the projection surface.

According to the aspect of the invention, it is possible to expect an effect that a restricting body closes a line of sight viewing the inside of the housing from a direction different from the direction of the channel (a moving direction of the air). Therefore, the inside of the housing does not affect the exterior. It is possible to achieve improvement of designability. In the case of a configuration for discharging the air from the opening formed in the housing, it is possible to lead the air discharged from the inside of the housing to a direction in which the air does not overlap image light. Therefore, it is possible to prevent the influence of the exhaust air on the projection image and satisfactorily keep visibility of the projection image. For example, when the projector is set above the projection surface and the image light is projected downward, the exhaust air is led toward the projection surface and upward. For example, when the projector is set below the projection surface and the image light is projected upward, the exhaust air is led toward the projection surface and in the downward direction.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

A first embodiment of the invention is explained below with reference to the figures.

Figure 1:
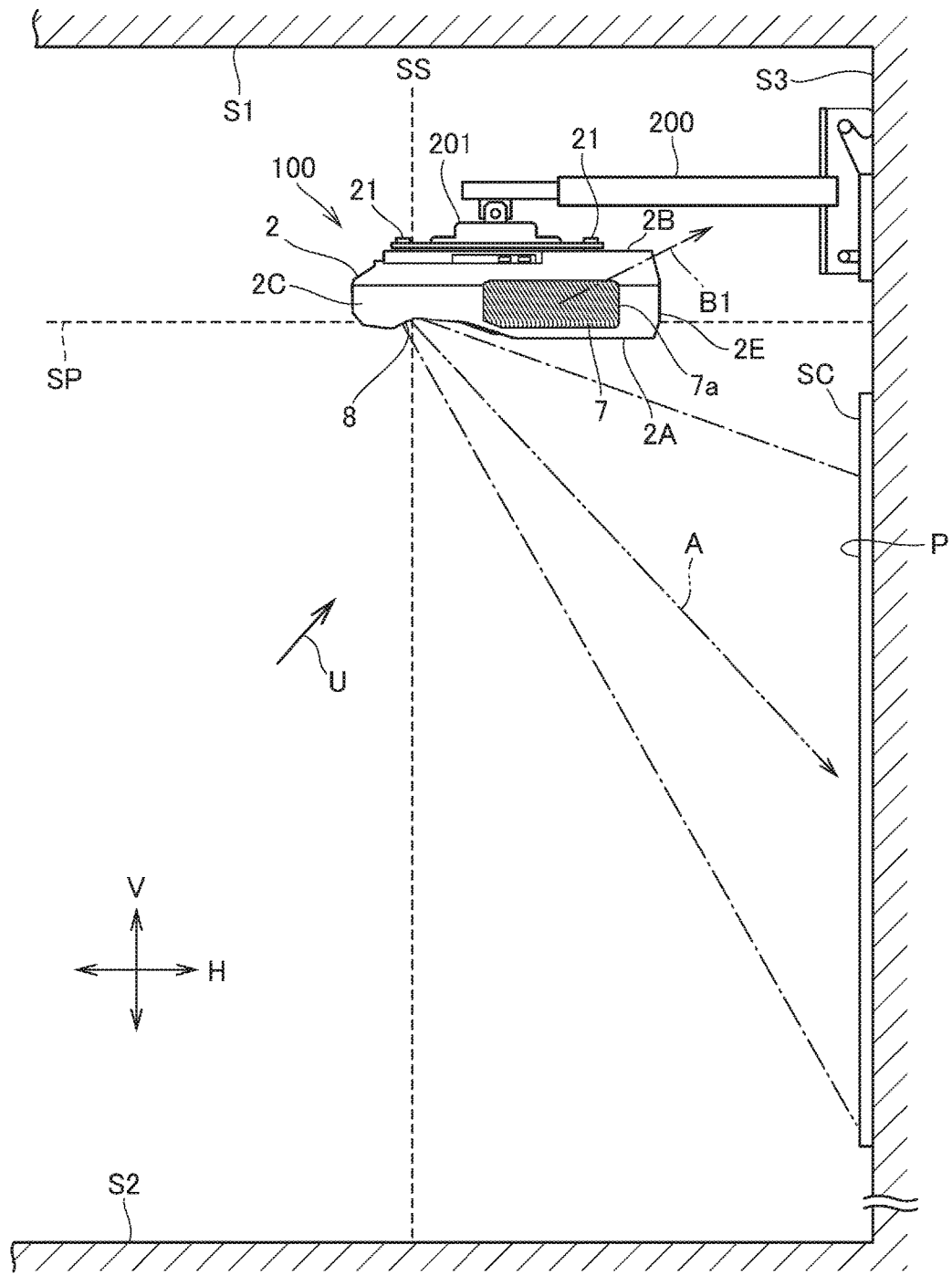
FIG. 1 is a side view showing a projector according to a first embodiment and a first setting state.
Figure 2:
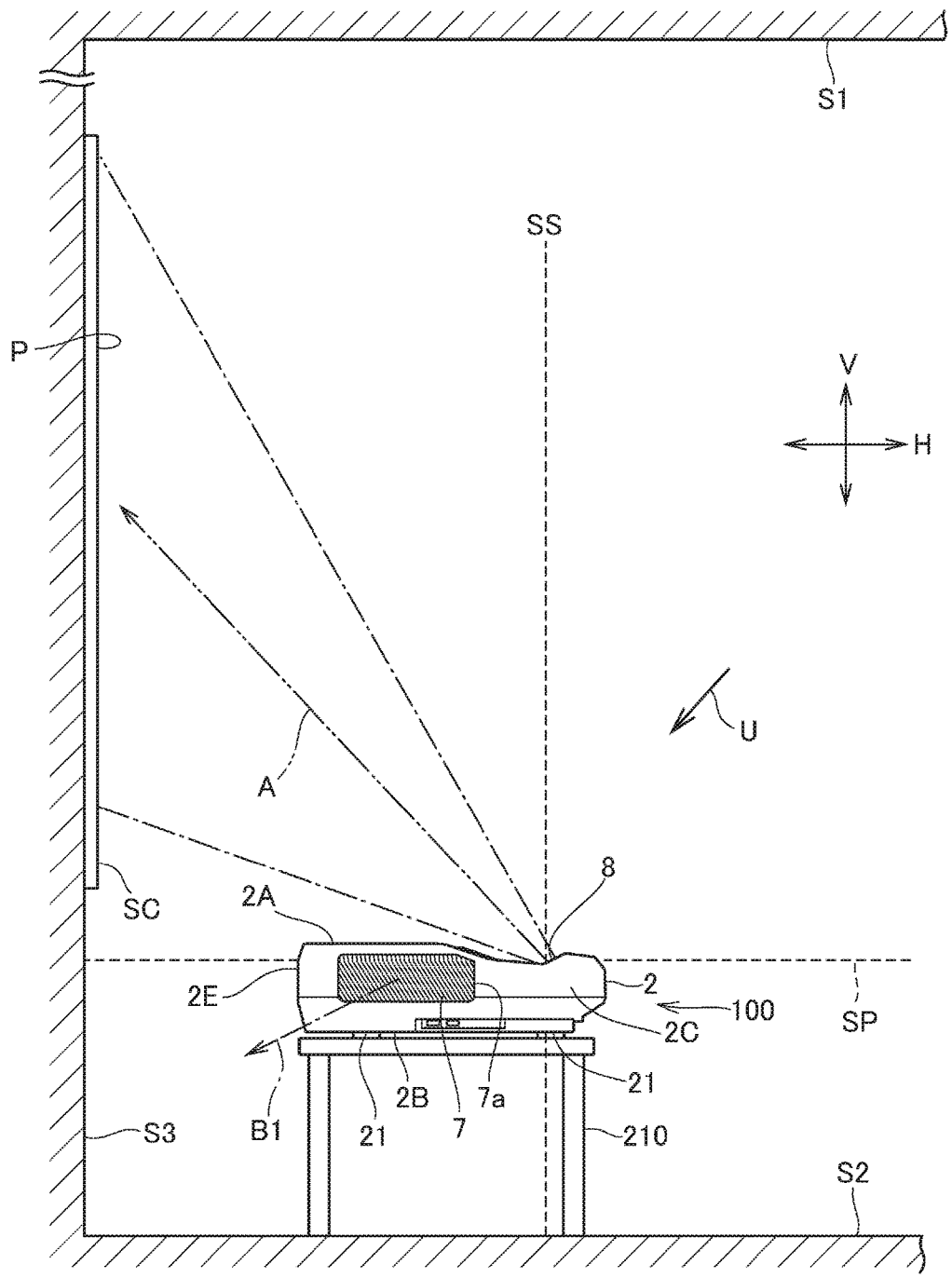
FIG. 2 is a side view showing the projector and a second setting state.

FIGS. 1 and 2 are side views showing the configuration of a projector 100 according to this embodiment and a setting state of the projector 100.

The projector 100 includes a projecting section 10 (FIG. 3) including a light source and a modulating device and configured to generate image light. The projector 100 projects the image light generated by the projecting section 10 (FIG. 3) toward a projection surface, which is a projection target, from a projection port 8 to thereby form (display) an image on the projection surface. In the explanation in this embodiment, it is assumed that a screen SC is set as the projection target and the projector 100 projects a projection image P on the screen SC.

FIGS. 1 and 2 respectively show a first setting state and a second setting state as examples of a setting state of the projector 100. Both of the first and second setting states respectively shown in FIGS. 1 and 2 are examples in which the projector 100 is set indoors. In FIGS. 1 and 2, a ceiling surface of a setting room is denoted by a reference sign S1, a floor surface of the setting room is denoted by a reference sign S2, and a wall surface opposed to the projector 100 is denoted by a reference sign S3.

As shown in FIGS. 1 and 2, the projector 100 includes a substantially box-shaped housing 2. The top surface of the housing 2 is denoted by a reference sign 2A and the bottom surface of the housing 2 is denoted by a reference sign 2B. In the first setting state, a side surface on the right side (a right side surface) in a projecting direction is denoted by a reference sign 2C and a side surface on the left side (a left side surface) in the projecting direction is denoted by a reference sign 2D (not shown in FIGS. 1 and 2). A surface (a rear surface) opposed to the screen SC is denoted by a reference sign 2E.

The first setting state shown in FIG. 1 is a form in which the projector 100 is set in an upper part of the setting room and is a state generally called ceiling-suspended setting. In the first setting state, the bottom surface 2B of the projector 100 faces the ceiling surface S1 and the top surface 2A of the projector 100 faces the floor surface S2. In the first setting state, the rear surface 2E faces the wall surface S3 side, that is, the screen SC side.

In the first setting state, the projector 100 is attached to an attachment arm 200. The attachment arm 200 is fixed to the ceiling surface S1 or the wall surface S3. In FIG. 1, an example is shown in which the attachment arm 200 is fixed to the wall surface S3. A bracket 201 for attaching suspension target devices is suspended at the distal end of the attachment arm 200.

A plurality of setting sections 21 are disposed on the bottom surface 2B of the housing 2. The setting sections 21 include bolts for fixing, bolt holes, or the like. In the first setting state, the setting sections 21 are coupled to the bracket 201, whereby the projector 100 is supported by the attachment arm 200.

In the example shown in FIG. 1, the screen SC is set on the wall surface S3. The projector 100 is attached to the attachment arm 200 in a direction in which the projector 100 projects image light toward the screen SC. Note that a projection target on which the projector 100 projects the image light is not limited to the screen SC. In the example shown in FIG. 1, the screen SC is set on the wall surface S3. However, the wall surface S3 itself may be used as the projection target. The projection target may be a uniform plane or may be a curved surface, a discontinuous surface, a surface having unevenness, or the like. The screen SC may be stuck to the wall surface S3 or suspended to be set or may be erected on the floor surface S2 close to the wall surface S3.

The projection port 8, through which light emitted from the inside of the housing 2 is transmitted, is set on the top surface 2A of the projector 100. The image light radiated by the projecting section 10 is emitted from the projection port 8. In this embodiment, a projecting direction of the projector 100 is denoted by a reference sign A. The projecting direction A indicates a direction in which the projector 100 projects the image light. An optical path of the image light corresponding to the center of the projection image P is shown as an arrow in the projecting direction A.

In the following explanation, an imaginary horizontal plane SP is used as a reference of the position and the direction of the projector 100. The imaginary horizontal plane SP is an imaginary plane that passes the projection port 8. The imaginary horizontal plane SP can also be defined as a plane parallel to the top surface 2A and/or the bottom surface 2B. When a gravity direction in a setting state (including the first setting state and the second setting state) of the projector 100 is represented as an up-down direction V, the imaginary horizontal plane SP may be set as a direction perpendicular to the up-down direction V. The imaginary horizontal plane SP may be defined as a surface perpendicular to the screen SC. The up-down direction V can be also be called perpendicular direction or vertical direction.

In FIG. 1, a direction perpendicular to the up-down direction V is represented as a horizontal direction H. The horizontal direction H means a linear direction. Specifically, the horizontal direction H indicates a direction perpendicular to the up-down direction V as shown in FIGS. 1 and 2 and a direction of approach to and separation from the screen SC.

In this case, the projecting direction A of the projector 100 is a downward direction with respect to the imaginary horizontal plane SP in the up-down direction V. The projector 100 projects image light obliquely downward toward the screen SC set below the housing 2.

In FIG. 1, an imaginary line SS passing the projection port 8 and perpendicular to the imaginary horizontal plane SP is shown. The imaginary line SS is a reference of a position of a user (or a viewer) viewing the projection image P of the screen SC. Specifically, when the projector 100 is used in the first setting state, the user viewing the projection image P is basically present behind the imaginary line SS, that is, on a far side from the screen SC with respect to the imaginary line SS. In particular, when the projector 100 is a projector of a short-focus type, since the distance between the imaginary line SS and the screen SC is short, the user is considered to be present on the rear side of the imaginary line SS. Therefore, a line of sight of the user viewing the housing 2 of the projector 100 from the rear of the imaginary line SS is in a direction in which the user looks up the housing 2 as indicated by a reference sign U in FIG. 1.

The second setting state shown in FIG. 2 is a state in which the projector 100 is set in a lower part of the setting room. The second setting state is generally called underlaid setting. In FIG. 2, an example is shown in which the projector 100 is placed on a setting table 210 set on the floor surface S2. A table on which the projector 100 is placed is not limited to the setting table 210. The projector 100 can be placed on a desk, a chair, and other utensils and equipment. Preferably, the projector 100 can be placed on any object having a plane. In the second setting state, the setting sections 21 disposed on the bottom surface 2B is in contact with the setting table 210 to support the projector 100. Note that the projector 100 may be directly set on the floor surface S2.

In FIG. 2, the up-down direction V, the horizontal direction H, the imaginary horizontal plane SP, and the imaginary line SS are shown as in FIG. 1. In the second setting state, the projector 100 is located below the screen SC located on the wall surface S3 side. Therefore, the projector 100 projects image light upward from the projection port 8 and forms the projection image P.

When the projector 100 is used in the second setting state, the user viewing the projection image P is basically present behind the imaginary line SS (a far side from the screen SC with respect to the imaginary line SS). A line of sight of the user viewing the housing 2 of the projector 100 from the rear of the imaginary line SS is a direction in which the user looks down the housing 2 as indicated by a reference sign U in FIG. 2.

Figure 3:
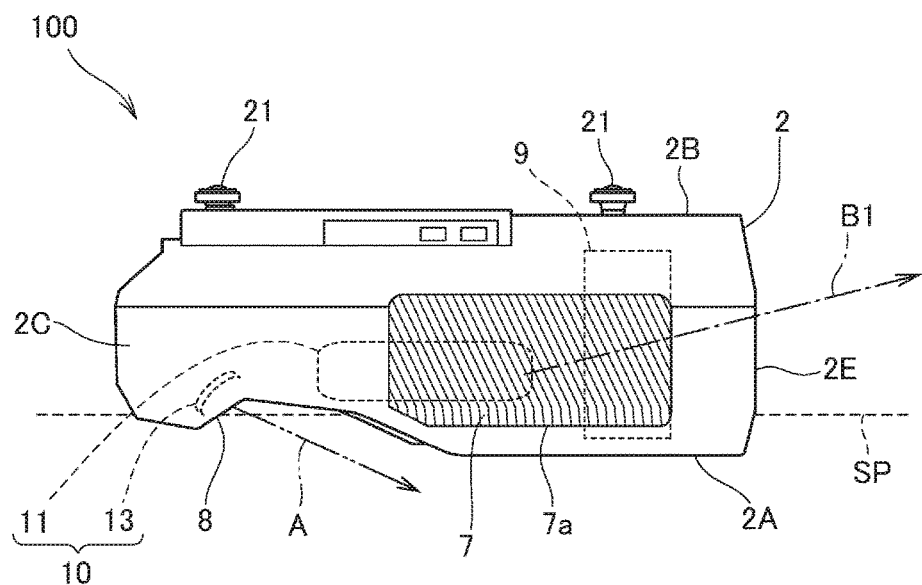
FIG. 3 is a right side view of the projector.
Figure 4:
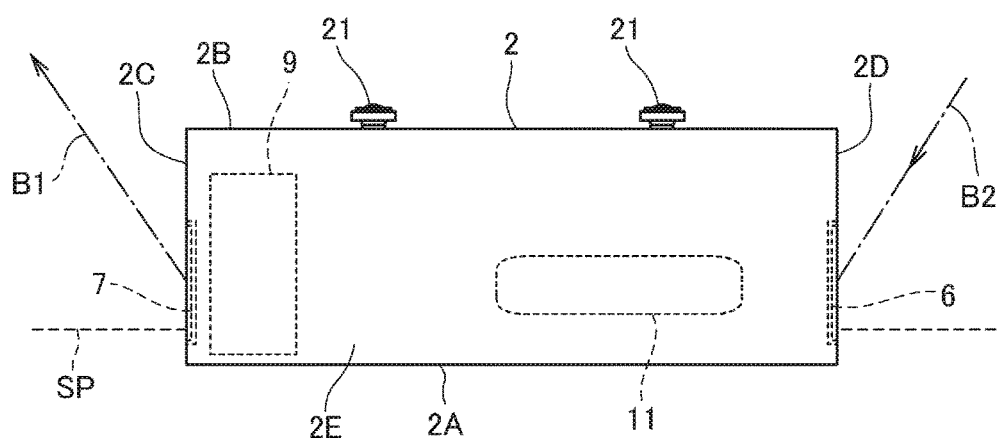
FIG. 4 is a rear view of the projector.
Figure 5:
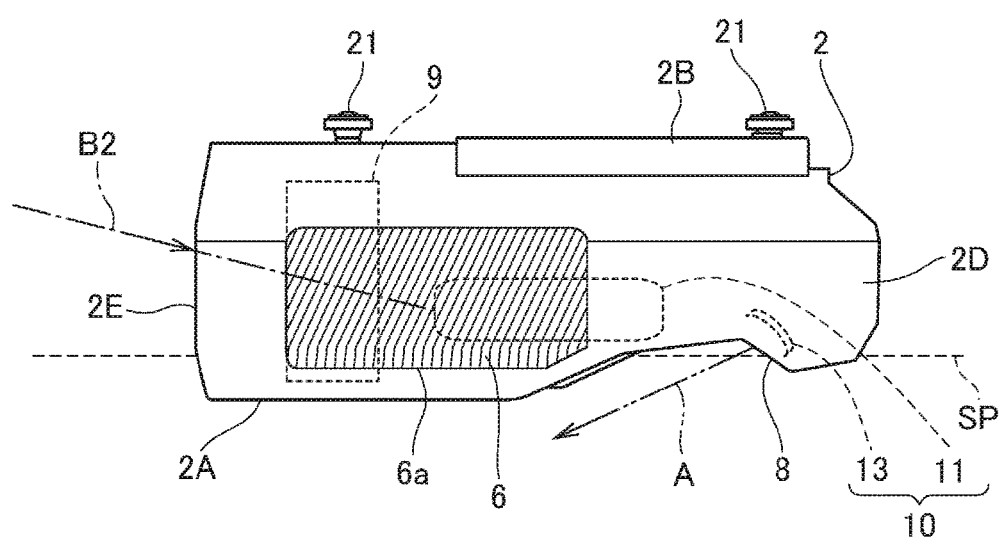
FIG. 5 is a left side view of the projector.

FIGS. 3, 4, and 5 are diagrams showing the configuration of the projector 100. FIG. 3 is a right side view, FIG. 4 is a rear view, and FIG. 5 is a left side view.

As shown in FIG. 3, an exhaust port 7a, which is an opening for performing exhaust from an internal space of the housing 2, is formed in the right side surface 2C. An exhaust panel 7 is attached to the exhaust port 7a. The exhaust panel 7 includes a louver configured to guide an air current of exhaust air from the inside of the housing 2 to a predetermined direction. The louver of the exhaust panel 7 has an effect of preventing the inside of the housing 2 from being easily seen from the outside through the exhaust port 7a. In this embodiment, the exhaust panel 7 is a component configured as a body separate from the housing 2 and is fixed to the exhaust port 7a. Note that the exhaust panel 7 may be formed integrally with the housing 2.

The direction of the air current discharged through the exhaust panel 7 (an exhaust direction) is denoted by a reference sign B1. As shown in FIGS. 1 and 2, in side view, in the horizontal direction H, the exhaust direction B1 is the same direction as the projecting direction A of the image light projected from the projection port 8. In the up-down direction V, the exhaust direction B1 is a direction on the opposite side of the projecting direction A. As shown in FIG. 4, in rear view or front view, the exhaust direction B1 is a direction from the right side surface 2C toward a side (the outer side) of the housing 2.

As shown in FIG. 5, an intake port 6a, which is an opening for taking the air into the internal space of the housing 2, is formed in the left side surface 2D. An intake panel 6 is attached to the intake port 6a. The intake panel 6 includes a louver. The louver of the intake panel 6 has an effect of smoothly leading the outdoor air into the inside of the housing 2 and preventing the inside of the housing 2 from being easily seen from the outside through the intake port 6a. In this embodiment, the intake panel 6 is a component configured as a body separate from the housing 2 and is fixed to the intake port 6a. Note that the intake panel 6 may be formed integrally with the housing 2.

A direction of an air current sucked by the intake panel 6 (an intake direction) is denoted by a reference sign B2. As shown in FIG. 5, in side view, in the horizontal direction H, the intake direction B2 is the opposite direction of the projecting direction A. In the up-down direction V, the intake direction B2 is the same direction as the projecting direction A. As shown in FIG. 4, in rear view or front view, the intake direction B2 is a direction from a side (the outer side) of the left side surface 2D toward the housing 2.

The louver of the intake panel 6 and the louver of the exhaust panel 7 are symmetrical as shown in FIG. 4. Therefore, as it is evident when FIG. 3 and FIG. 5 are compared, the exhaust direction B1 and the intake direction B2 are opposite directions. In this configuration, the direction of the louver of the exhaust panel 7 on the right side surface 2C and the direction of the louver of the intake panel 6 on the left side surface 2D are in the same direction with respect to the projecting direction A. Therefore, for example, the exhaust panel 7 and the intake panel 6 can be formed in the same or similar configurations. In this embodiment, it is assumed that the configuration of the louver of the intake panel 6 is common to the configuration of the louver of the exhaust panel 7. The configuration of the exhaust panel 7 is explained below. The configuration of the intake panel 6 is omitted.

The projector 100 includes an exhaust device 9. The exhaust device 9 is a device housed on the inside of the housing 2 and configured to generate an air current discharged to the outside of the housing 2 through the exhaust panel 7. The exhaust device 9 is configured by, for example, an axial flow fan. As shown in FIG. 4, the exhaust device 9 is disposed in a position close to the right side surface 2C on the inside of the housing 2 and configured to allow the air current generated by the exhaust device 9 to easily flow to the exhaust panel 7. The exhaust device 9 performs exhaust to the outside of the housing 2, whereby, in the intake port 6a, an air current flowing to the inside of the housing 2 through the intake panel 6 is generated. That is, an air current corresponding to the exhaust air from the exhaust panel 7 flows into the housing 2 through the intake panel 6. Consequently, the projector 100 produces an air current sucked from the left side surface 2D and discharged from the right side surface 2C. Heat emitted by the projecting section 10 housed in the housing 2, a power supply device (not shown in FIGS. 3 to 5) that supplies electric power to sections including the projecting section 10, a circuit (not shown in FIGS. 3 to 5) that performs image processing concerning an image projected by the projecting section 10, and the like is discharged to the outside of the housing 2 by the air current.

An optical device 11 and a mirror 13 configuring the projecting section 10 are disposed on the inside of the housing 2. The optical device 11 includes, as a light source (not shown in FIGS. 3 to 5), a lamp such as a halogen lamp, a xenon lamp, or an ultra-high pressure mercury lamp or a solid-state light source such as an LED or a laser light source. Further, the optical device 11 includes a light modulating device (not shown in FIGS. 3 to 5) configured to modulate light emitted by the light source and generate image light. The light modulating device includes an element such as a liquid crystal light valve of a transmission type, a liquid crystal light valve of a reflection type, or a digital mirror device (DMD). The optical device 11 may include a driving circuit configured to drive the light modulating device and a circuit configured to supply electric power to the light source. As shown in FIG. 3, the optical device 11 is disposed on the inside of the housing 2 and is located in a position overlapping an air current flowing from the intake panel 6 to the exhaust panel 7 or in the vicinity of the air current. Therefore, heat emitted by the light source or the like of the optical device 11 is discharged to the outside of the housing 2 by the air current generated by the exhaust device 9. The optical device 11 is appropriately cooled by the outdoor air flowing into the optical device 11 from the intake panel 6.

Figure 6:
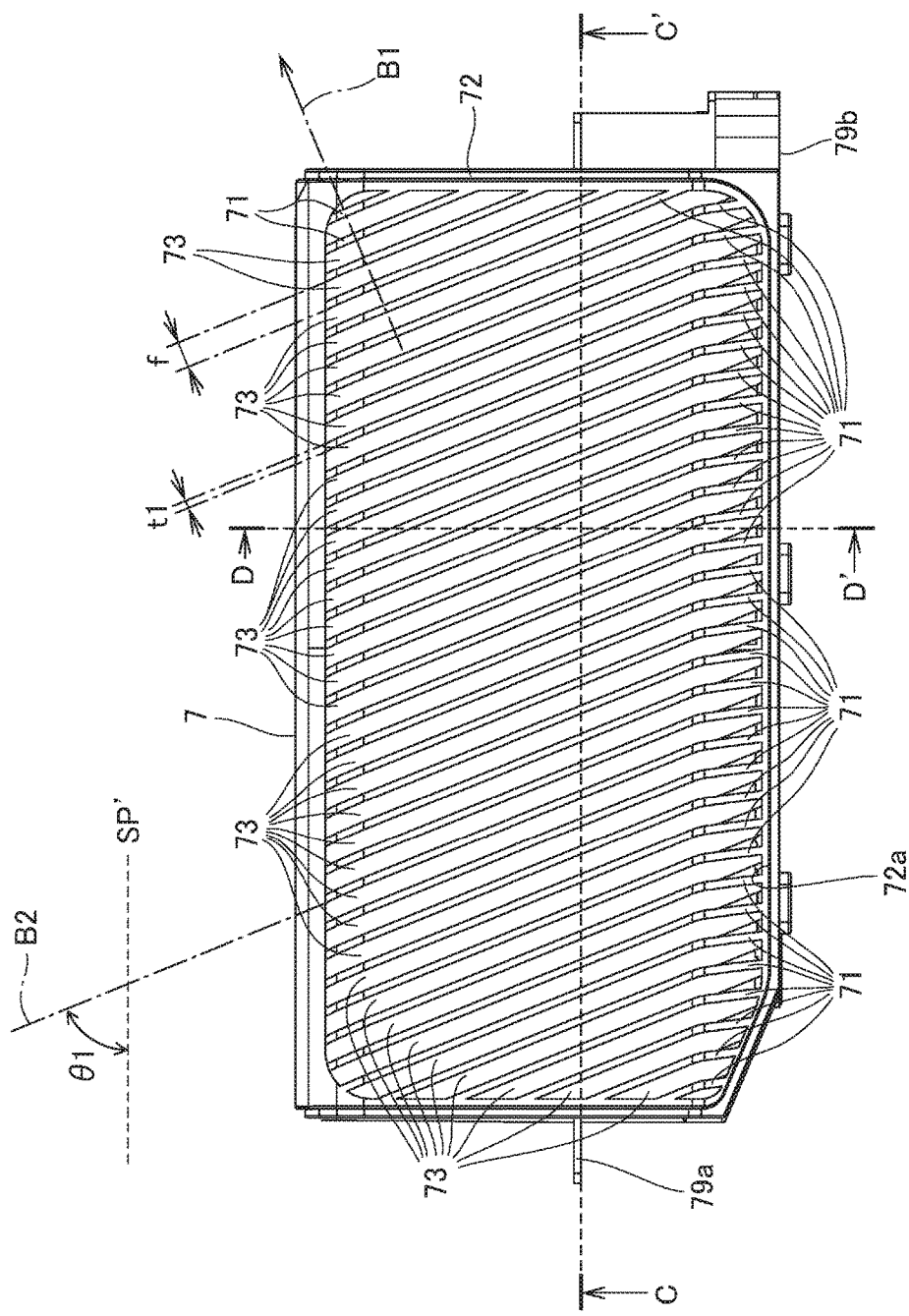
FIG. 6 is a front view of an exhaust panel.
Figure 7:
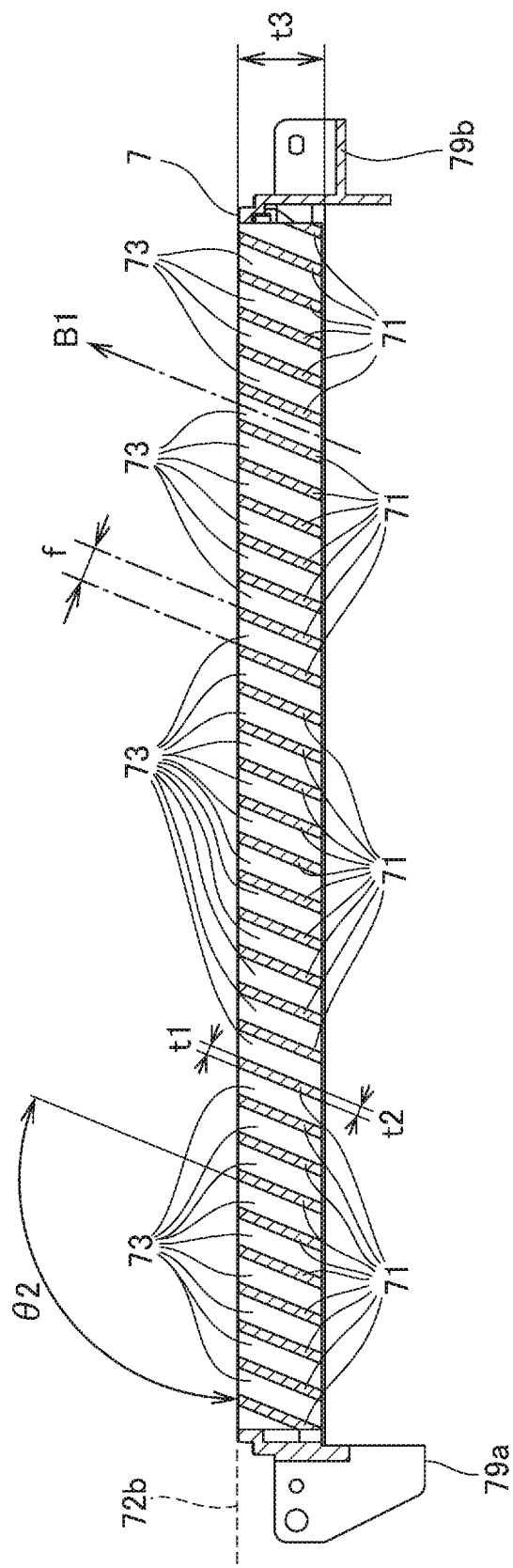
FIG. 7 is a C-C' sectional view of FIG. 6.
Figure 8:
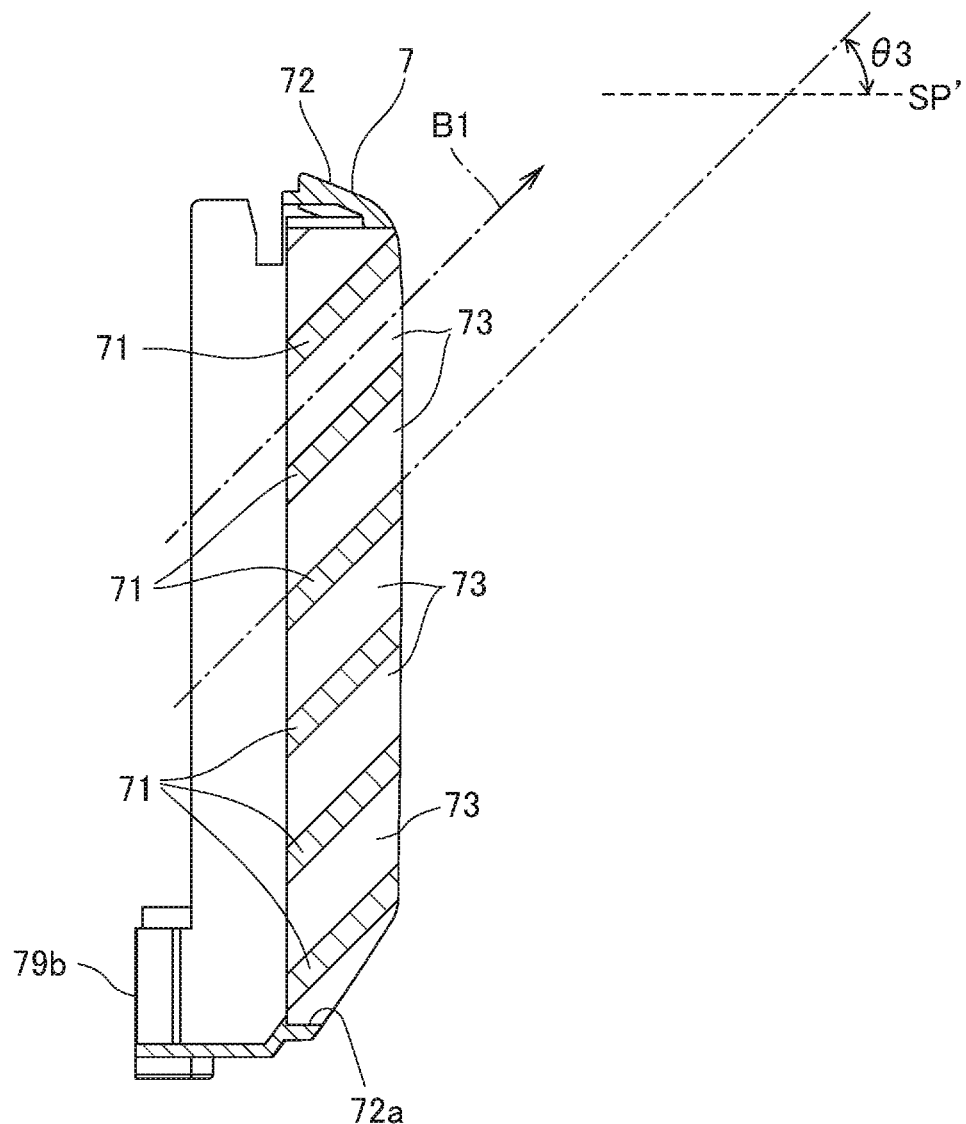
FIG. 8 is a D-D' sectional view of FIG. 6.
Figure 9:
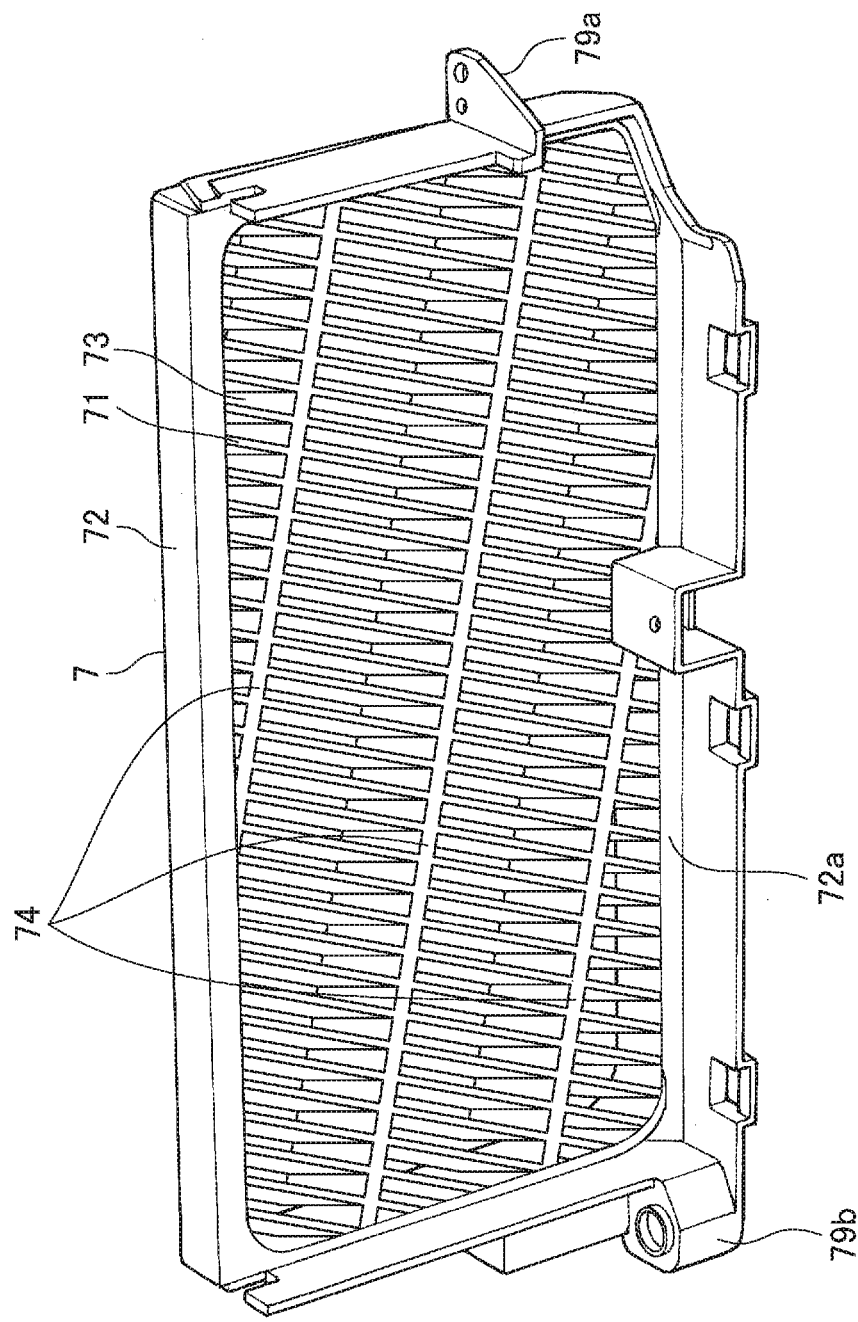
FIG. 9 is a rear view of the exhaust panel.

FIG. 6 is a front view showing the configuration of the exhaust panel 7. FIG. 7 is a C-C' sectional view of FIG. 6. FIG. 8 is a D-D' sectional view of FIG. 6. FIG. 9 is a rear view of the exhaust panel 7.

As shown in FIG. 6, the exhaust panel 7 includes a frame 72 formed in a substantially rectangular shape and a plurality of fins 71 (restricting bodies) fixed on the inner side of the frame 72. The louver is formed by the plurality of fins 71. Spaces of a predetermined size are provided among the fins 71 adjacent to one another. The spaces function as channels 73 in which an air current flows in the exhaust direction B1. In other words, the plurality of fins 71 form the channels 73 in the exhaust direction B1.

At side end portions of the frame 72, attaching sections 79a and 79b respectively project. In a state in which the exhaust panel 7 is attached to the exhaust port 7a (FIG. 1), the attaching sections 79a and 79b are fixed to the right side surface 2C by screws (not shown in FIG. 6) and the like.

The fins 71 are fixed in a direction tilting with respect to the frame 72. In FIG. 6, an imaginary plane SP' is shown. The imaginary plane SP' is a plane parallel to a lower surface 72a of the frame 72. The imaginary plane SP' is parallel to the imaginary horizontal plane SP (FIG. 1) in a state in which the exhaust panel 7 is attached to the exhaust port 7a. The fins 71 tilt by an angle θ1 with respect to the imaginary plane SP' on the front surface of the exhaust panel 7 shown in FIG. 6, that is, in a surface on the outer side of the exhaust panel 7. Since the plurality of fins 71 included in the exhaust panel 7 are disposed in parallel, the respective fins 71 have the tilt of the angle θ1.

As shown in FIG. 7, in a C-C' section of FIG. 5, the respective fins 71 have tilts of an angle θ2 with respect to a surface 72b extending along the outer side of the exhaust panel 7. As shown in FIG. 8, in a D-D' section of FIG. 5, the respective fins 71 have tilts of an angle θ3 with respect to the imaginary plane SP'.

The angles θ1, θ2, and θ3, which are the tilts of the fins 71, are equal to the tilts of the channels 73, which are the spaces among the fins 71 arranged in parallel. Therefore, the exhaust direction B1 of the exhaust air flowing in the channels 73 has the same tilt as the fins 71. As shown in FIGS. 1 and 2, the tilt of the angle θ2 is equivalent to an angle of the exhaust direction B1 directed to the same side as the projecting direction A, that is, the forward direction (the screen SC side) in the horizontal direction H. The tilt of the angle θ3 is equivalent to an angle of the exhaust direction B1 directed upward with respect to the imaginary horizontal plane SP. The angle θ1 is, for example, an acute angle. Specifically, the angle θ1 can be set to 68°. The angle θ2 is, for example, an obtuse angle and can be set to, for example, 112°. The angle θ3 is, for example, an acute angle. Specifically, the angle θ3 can be set to 45°.

Since the fins 71 have the tilt of the angle θ3, in the first setting state of the projector 100, the channels 73 face upward with respect to the housing 2 from the inner side toward the outer side of the housing 2. Therefore, the exhaust direction B1 is directed upward with respect to the projector 100 that projects image light downward. In the second setting state, the channels 73 face downward with respect to the housing 2 from the inner side toward the outer side of the housing 2. Therefore, the exhaust direction B1 is directed downward with respect to the projector 100 that projects image light upward. Consequently, the air discharged from the housing 2 through the exhaust panel 7 is led to the exhaust direction B1 in which the air does not overlap the image light of the projection image P.

As explained above, the exhaust air of the housing 2 often has higher temperature than the temperature of the setting chamber of the projector 100 because of the influence of a device having a large heat value such as the optical device 11 housed in the housing 2. When such high-temperature air overlaps the image light projected from the projection port 8, a heat haze-like mist occurs in the projection image P. By setting the exhaust direction B1 in the direction in which the air does not overlap the image light of the projection image P, in the projector 100, it is possible to prevent the influence of the exhaust air on the projection image P.

Since the exhaust direction B1 is directed to the screen SC side in the horizontal direction H, when the user is present behind the imaginary line SS, the exhaust air does not flow to the user. Therefore, it is possible to reduce an amount of the exhaust air higher in temperature than the room temperature flowing to the user side and suppress the influence of the exhaust air on the user.

Further, since the fins 71 have the tilts of the angles θ1, θ2, and θ3, there is an effect that a line of sight of the user in the direction indicated by the reference sign U in FIGS. 1 and 2 is blocked. As indicated by the reference sign U, in the first setting state shown in FIG. 1, the user looks up the intake panel 6 and the exhaust panel 7 provided in the projector 100.

Since the fins 71 have the tilts such that the channels 73 face the screen SC side, a line of sight of the user directed to the channels 73 from the rear surface side and the lower side of the projector 100 can be blocked by the surfaces of the fins 71. Therefore, even if the user directs the line of sight in the direction U to the projector 100, it less easily occurs that the inside of the housing 2 is visually recognized through the channels 73. It is possible to expect an effect of preventing the inside of the housing 2 from being easily seen from the outside. Therefore, it is possible to achieve improvement of designability of the exterior of the projector 100.

When the intake panel 6 is formed in a configuration common to the exhaust panel 7, in the intake panel 6 as well, a line of sight from the outside of the housing 2 (e.g., a line of sight in the direction U) is blocked by the louver. Therefore, it is possible to expect an effect of preventing the inside of the housing 2 from being easily seen in the intake port 6a.

In this way, since the fins 71 are three-dimensionally tilted, concerning the exhaust air from the exhaust panel 7, it is possible to obtain the effect of preventing the influence of the exhaust air on the projection image P, the effect of suppressing the influence of the exhaust air on the user, and the effect of preventing the inside of the housing 2 from being easily seen.

The fins 71 may be flat plates having fixed thickness. However, the fins 71 may have shapes having differences in thickness. For example, the fins 71 can be formed in a shape having different thicknesses on the outer side and the inner side of the housing 2. Specifically, it is desirable to set thickness t2 (FIG. 7) of the fins 71 on the inner side of the housing 2 large compared with thickness t1 (FIG. 6) of the fins 71 on the outer side of the housing 2. For example, when the thickness t1 is set to 1.6 mm, the thickness t2 can be set to 2.0 mm or more. In this case, thickness t3 of the frame 72 is desirably large in order to fix the fins 71. The thickness t3 can be set to, for example, 13 mm.

The fins 71 can be formed of a material having opaqueness or a light blocking effect. In this case, with the fins 71, it is possible to further improve the effect of preventing the inside of the housing 2 from being easily seen with respect to the line of sight in the direction U (FIGS. 1 and 2).

A size of the channels 73 (a sectional area of a flow of the air in the channels 73) can be determined by an interval f among the fins 71 adjacent to one another. For example, when the interval f is set to 5.6 mm or more, ventilation resistance of the exhaust panel 7 is small. It is possible to discharge a sufficient amount of the air through the exhaust panel 7.

In a manufacturing process of the exhaust panel 7, when the frame 72 and the fins 71 are integrally molded by, for example, injection molding in which a mold (not shown in FIG. 6) is used, it is possible to relatively easily realize a state in which the plurality of fins 71 are arranged in parallel and fixed to the frame 72.

In particular, a draft angle is formed by differentiating the thickness of the fins 71 on the inner side and the outer side of the housing 2 as explained above. By using the draft angle, it easy to release the exhaust panel 7 even if the exhaust panel 7 has a complicated shape in which the plurality of fins 71 are disposed. As the thickness of the fins 71 is larger, the rigidity of the fins 71 increases. Therefore, it is possible to suppress adhesion of the fins 71 to the mold.

As shown in FIG. 9, a plurality of ribs 74 are provided on the rear surface of the exhaust panel 7. The ribs 74 are coupled to the respective fins 71 included in the exhaust panel 7. In detail, the respective fins 71 are coupled to at least one or more ribs 74. The respective ribs 74 are disposed to extend over the plurality of fins 71. The respective ribs 74 are desirably extended in a direction perpendicular to the tilts (e.g., the angle θ1 in FIG. 5) of the fins 71. Since the ribs 74 couple the plurality of fins 71 to one another, it is possible to expect an effect of increasing the rigidity of the louver configured by the fins 71. It is possible to increase strength in a direction perpendicular to the fins 71. The ribs 74 can be easily formed together with the fins 71 by injection molding.

Note that the frame 72 and the plurality of fins 71 may be integrally molded on the right side surface 2C. In this case, it is possible to reduce the number of components of the projector 100. It is possible to reduce man-hour for manufacturing of the projector 100.

As explained above, the projector 100 in this embodiment is the projector 100 that projects an image on the screen SC. The projector 100 includes the projection port 8 for projecting an image in a direction tilting to the lower side or the upper side with respect to the horizontal direction H. The projector 100 includes the housing 2 and the exhaust panel 7 provided in the exhaust port 7a, which is formed in the housing 2, and configured to restrict a moving direction of the air discharged through the exhaust port 7a. The exhaust port 7a is formed on the left or right side surface (in this embodiment, the right side surface 2C) toward the projecting direction A of the image in the housing 2. The exhaust panel 7 forms the channels 73 that connect the inner side and the outer side of the housing 2. The channels 73 respectively have tilts that comes, from the inner side toward the outer side, closer to a direction vertically opposite to the projecting direction A of the image and closer to the screen SC.

With the projector 100 applied with the invention, with the exhaust panel 7, it is possible to lead the air discharged from the inner side of the housing 2 to a direction in which the air does not overlap a projection image. Therefore, it is possible to prevent the influence of exhaust air on the projection image and satisfactorily keep visibility of the projection image.

For example, when the projector 100 is set above the screen SC to project an image downward, the exhaust air is led toward the screen SC and upward. For example, when the projector 100 is set below the screen SC to project an image upward, the exhaust air is led toward the screen SC and in a downward direction.

It is possible to expect an effect that the fins 71 block a line of sight viewing the inside of the housing 2 from a direction different from the direction of the channels 73 (the moving direction of the air). Therefore, the inside of the housing 2 does not affect the exterior. It is possible to achieve improvement of designability.

The exhaust panel 7 includes the plurality of fins 71 extending along the extending direction of the channels 73. By arraying the plurality of fins 71 in this way, it is possible to easily form the channels 73 that guide exhaust air.

In the projector 100, the thickness t2 of the fins 71 on the inner side of the housing 2 and the thickness t1 of the fins 71 on the outer side are different. The thickness t2 is larger than the thickness t1. Consequently, when a restricting body is molded by a manufacturing method in which a mold is used, by giving, to the restricting body, a draft angle due to a difference between the thicknesses the fins 71 on the inner side and the outer side of the housing 2, it is easy to release the exhaust panel 7.

The fins 71 include surfaces having opaqueness or a light blocking effect. Therefore, it is possible to hide the inner side of the fins 71 from a line of sight directed to the fins 71 on the outer side.

The projector 100 includes the frame 72 attached to the housing 2. The fins 71 are fixed to the frame 72. By using the frame 72 in this way, it is easy to array the plurality of fins 71 on the exhaust panel 7.

The projector 100 can also be configured to include the exhaust panel 7 formed integrally with the right side surface 2C of the housing 2 in which the exhaust port 7a is formed. In this case, since the frame 72 is unnecessary, it is possible to reduce the number of components of the projector 100. It is possible to reduce man-hour for assembly of the projector 100.

The projector 100 includes the exhaust device 9 configured to discharge the air on the inner side of the housing 2 from the exhaust port 7a. By using the exhaust device 9 in this way, it is possible to discharge the air on the inner side of the housing 2 to the outer side through the exhaust panel 7.

The exhaust panel 7 in this embodiment is the exhaust panel 7 attached to the exhaust port 7a formed in the housing 2 of the projector 100 that projects an image on the screen SC. The projecting direction A of the image is a direction tilting to the lower side with respect to the horizontal direction H. The exhaust port 7a is formed on the right side surface 2C toward the projecting direction A of the image in the housing 2. In a state in which the exhaust panel 7 is attached to the exhaust port 7a, the exhaust panel 7 forms the channels 73 that connect the inner side and the outer side of the housing 2. The channels 73 have tilts that comes, from the inner side toward the outer side, closer to a direction vertically opposite to the projecting direction A of the image and closer to the screen SC.

With the exhaust panel 7 applied with the invention, it is possible to lead the air discharged from the inner side of the housing 2 to a direction in which the air does not overlap the image. Therefore, it is possible to prevent the influence of the exhaust air on the projection image and satisfactorily keep visibility of the projection image.

For example, when the projector 100 is set above the screen SC and the image is projected downward, the exhaust air is led toward the screen SC and upward. For example, when the projector 100 is set below the screen SC and the image is projected upward, the exhaust air is led toward the screen SC and in the downward direction.

It is possible to expect an effect that the fins 71 block a line of sight viewing the inside of the housing 2 from a direction different from the direction of the channels 73 (the moving direction of the air). Therefore, the inside of the housing 2 does not affect the exterior. It is possible to achieve improvement of designability.

The intake port 6a functioning as the opening of the housing 2 is formed in the left side surface 2D toward the projecting direction A of the image in the housing 2. The projector 100 includes the intake panel 6 provided in the intake port 6a, which is formed in the housing 2, and configured to restrict the moving direction of the air sucked through the intake port 6a. The intake panel 6 forms channels that connect the inner side and the outer side of the housing 2. The channels formed in the intake panel 6 have tilts that comes, from the inner side toward the outer side, closer to a direction vertically opposite to the projecting direction A of the image and closer to the screen SC. By applying the opening of the invention to the intake port 6a, it is possible to expect an effect of blocking a line of sight viewing the inside of the housing 2 from a direction different from the direction of the channels formed by the intake panel 6 (the moving direction of the air). Therefore, the inside of the housing 2 does not affect the exterior. It is possible to achieve improvement of designability.

If the projector 100 is configured to include the intake panel 6 integrally formed on the left side surface 2D of the housing 2 in which the intake port 6a is formed, the frame of the intake panel 6 is unnecessary. Therefore, it is possible to reduce the number of components of the projector 100. It is possible to reduce man-hour of assembly of the projector 100.

The intake panel 6 in this embodiment is the intake panel 6 attached to the intake port 6a formed in the housing 2 of the projector 100 that projects an image on the screen SC. The projecting direction A of the image is a direction tilting to the lower side or the upper side with respect to the horizontal direction H. The intake port 6a is formed on either one of left and right surfaces (in this embodiment, the left side surface 2D) in the projecting direction A of the image in the housing 2. In a state in which the intake panel 6 is attached to the intake port 6a, the intake panel 6 forms channels that connect the inner side and the outer side of the housing 2. The channels have tilts that comes, from the inner side toward the outer side, closer to a direction vertically opposite to the projecting direction A of the image and closer to the screen SC. With the intake panel 6 applied with the invention, it is possible to expect an effect of blocking a line of sight viewing the inside of the housing 2 from a direction different from the direction of the channels (the moving direction of the air). Therefore, the inside of the housing 2 does not affect the exterior. It is possible to achieve improvement of designability.

Second Embodiment

Figure 10:
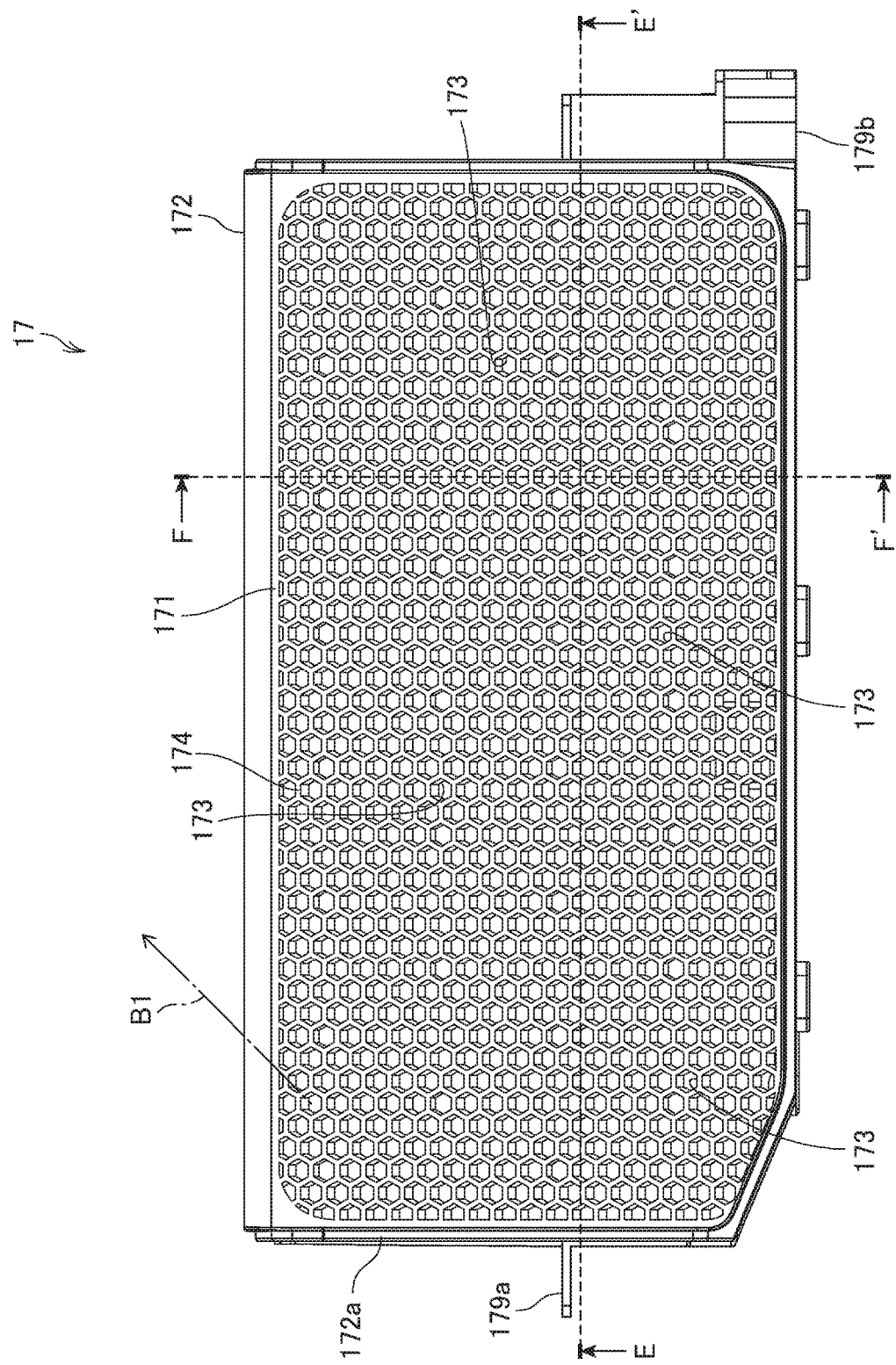
FIG. 10 is a front view of an exhaust panel in a second embodiment.
Figure 11:
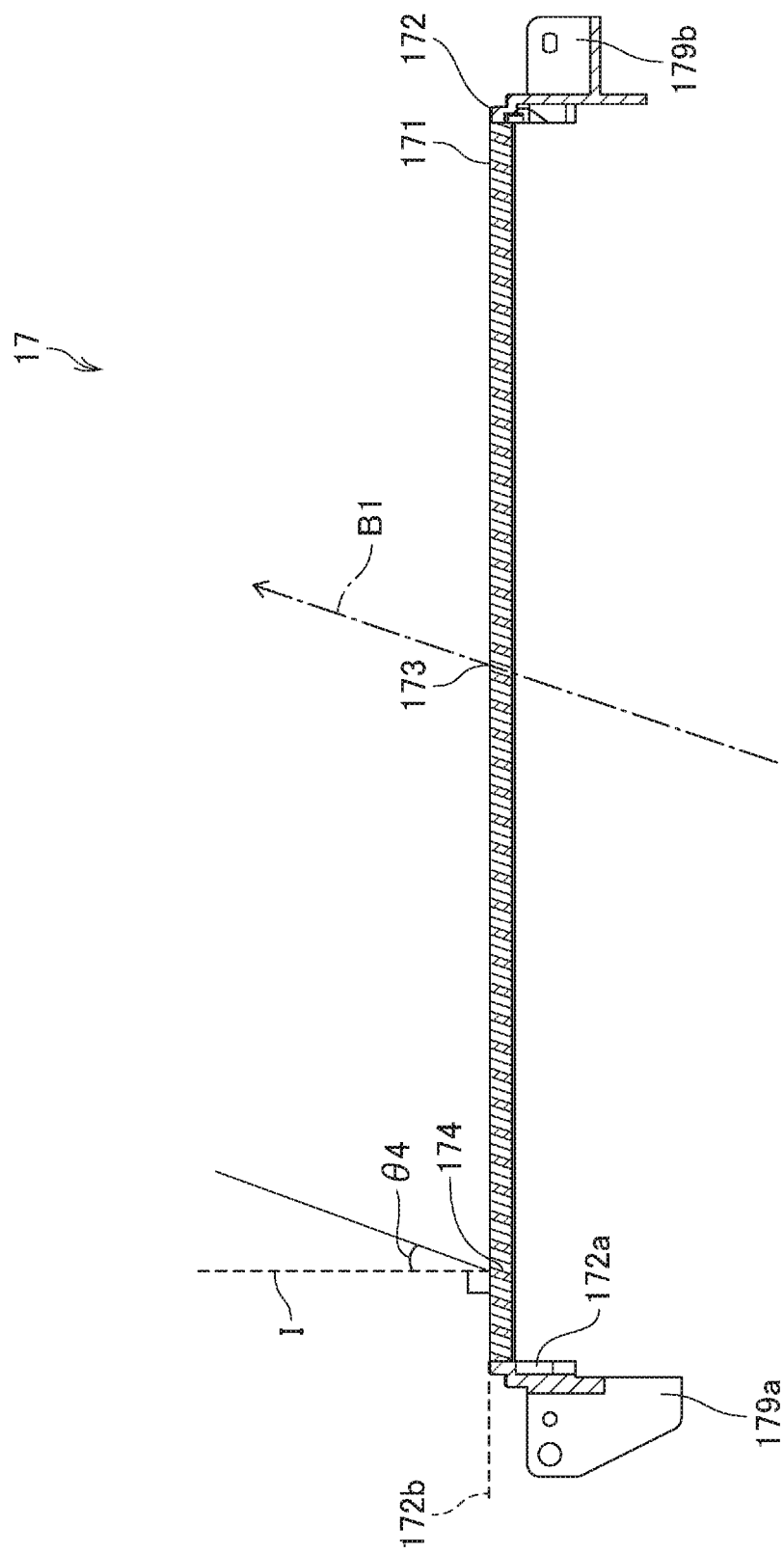
FIG. 11 is an E-E' sectional view of FIG. 10.
Figure 12:
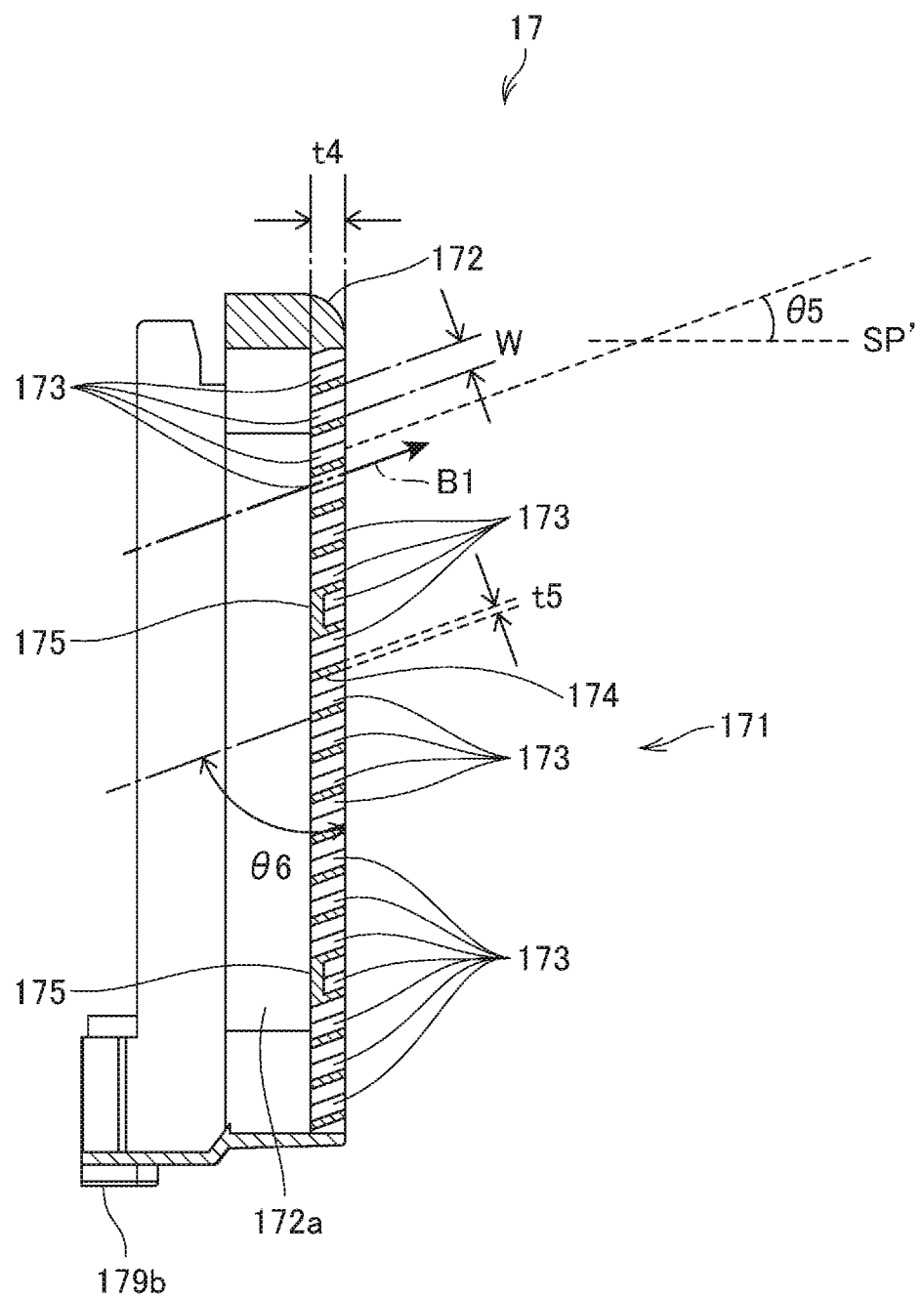
FIG. 12 is an F-F' sectional view of FIG. 10.
Figure 13:
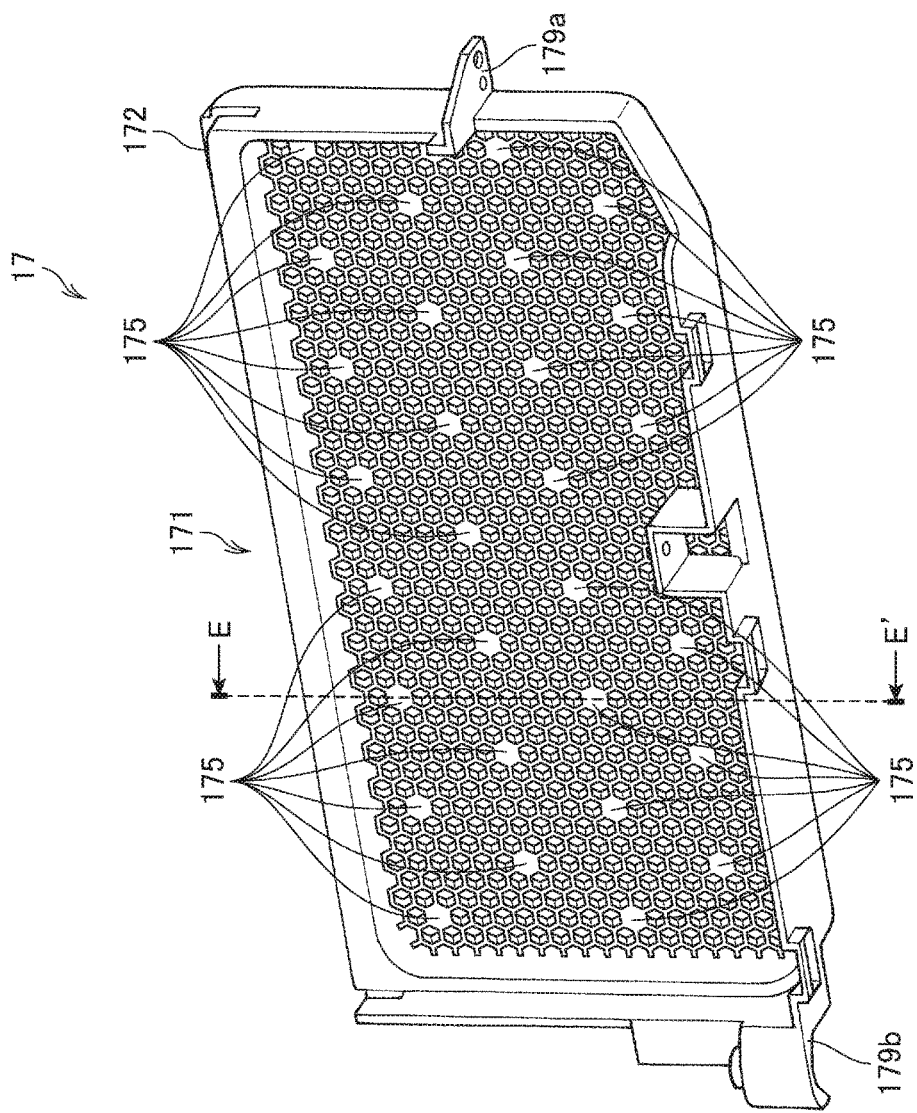
FIG. 13 is a rear view of the exhaust panel.

FIG. 10 is a front view showing the configuration of an exhaust panel 17 according to a second embodiment. FIG. 11 is an E-E' sectional view of FIG. 10. FIG. 12 is an F-F' sectional view of FIG. 10. FIG. 13 is a rear view of the exhaust panel 17.

In the second embodiment, an example is explained in which, instead of the exhaust panel 7, the exhaust panel 17 is disposed in the exhaust port 7a formed in the housing 2 of the projector 100. Note that the same portions as the portions in the first embodiment are denoted by the same reference numerals and signs and explanation of the portions is omitted.

Like the exhaust panel 7 (FIG. 1), the exhaust panel 17 leads exhaust air discharged from the inside of the housing 2 through the exhaust port 7a to an exhaust direction B1.

The exhaust panel 17 (a restricting section or a panel for opening) includes, as shown in FIG. 10, a frame 172 formed in a substantially rectangular shape and a hollow body 171 (a restricting body). Attaching sections 179a and 179b respectively project at side end portions of the frame 172. In a state in which the exhaust panel 17 is attached to the exhaust port 7a (FIG. 1), the attaching sections 179a and 179b are fixed to the right side surface 2C by screws (not shown in FIG. 10) or the like.

The hollow body 171 has a so-called honeycomb structure in which hollows having a hexagonal shape in section are alternately arrayed. The respective hollows formed in the hollow body 171 have a tubular shape that communicates with a surface facing the inner side and a surface facing the outer side of the housing 2 in the exhaust panel 17. The respective hollows form channels 173 that connect the inner side and the outer side of the housing 2 on the inside of the hollow body 171. In the hollow body 171, in particular, a wall in which the channels 173 are formed is set as a wall section 174.

As shown in FIG. 11, the wall section 174 has a tilt of an angle θ4 with respect to an imaginary reference line I perpendicular to a surface 172b extending along the outer side of the frame 172. The imaginary reference line I is parallel to a surface 172a on the inner side in a side portion of the frame 172. Therefore, when the projector 100 is set in the first setting state (FIG. 1), the channel 173 of the hollow body 171 faces the screen SC side with respect to the housing 2.

As shown in FIG. 12, the wall section 174 has a tilt of an angle θ5 with respect to the imaginary surface SP'. In another expression, the wall section 174 tilts at a tilt of an angle θ6 with respect to the long side of the surface 172a. Therefore, in the first setting state of the projector 100, the channels 173 are directed upward with respect to the housing 2. Therefore, the exhaust direction B1 is directed upward. The angle θ6 is an acute angle and can be set to, for example, 72°. With the tilts of the channels 173, the channels 173 are directed upward in the first setting state in which image light is projected downward. It is possible to lead the air discharged from the inside of the housing 2 to a direction in which the air does not overlap the image light of the projection image P.

In this state, when the user views the housing 2 from behind the imaginary line SS (FIG. 1), the user looks up the exhaust panel 17 from the near lower side of the screen SC.

In the hollow body 171 in which the channels 173 are formed, the wall section 174 has the tilts of the angles θ4 and θ5. Therefore, a line of sight of the user can be blocked by the hollow body 171. Further, the hollow body 171 may be configured to have opaqueness or a light blocking effect. In this case, it is possible to hide the inside of the housing 2 from a line of sight directed from the outside of the projector 100 to the exhaust panel 17.

In this way, the wall section 174 of the hollow body 171 is three-dimensionally tilted with respect to the housing 2. Therefore, it is possible to obtain an effect that the exhaust air does not affect display quality of the projection image P and an effect of blocking the inside of the housing 2 from a line of sight of the user.

The exhaust panel 17 can be manufactured by integrating the frame 172 and the wall section 174 with, for example, injection molding in which a mold is used and can be realized by a small number of components. Since the hollow body 171 has a honeycomb structure, there is an effect that the resin easily flows into the mold. It is easy to fix the thickness of the wall section 174.

Since the hollow body 171 has the honeycomb structure, it is possible to prevent the strength of the exhaust panel 17 from becoming insufficient even if the frame 172 and the hollow body 171 are reduced in thickness. Specifically, it is possible to reduce the thickness of the frame 172 indicated by a reference sign t4 in FIG. 12. For example, it is possible to set the thickness t4 to 4 mm or less. Since the channels 173 are the hollows of the honeycomb structure, an opening area of the channels 173 on the outer side of the housing 2 is small with respect to the depth of the channels 173 (the thickness of the hollow body 171). Therefore, even if the thickness t4 of the frame 172 is small, visibility is low when the inside of the housing 2 is seen from the outer side of the housing 2 through the exhaust panel 17.

When thickness t5 (FIG. 12) of the wall section 174 is reduced, the opening area of the channels 173 with respect to the area of the wall section 174 increases. That is, since an opening ratio of the exhaust panel 17 on the outer side of the housing 2 increases, it is possible to increase an amount of exhaust air discharged through the exhaust panel 17. The thickness t5 can be set to, for example, 1 mm or less. In this case, if the size of an opening of the channel 173 opened on the outer side of the housing 2 is represented by width w of one side and the opposite side configuring a hexagonal shape in section, the width w can be set to, for example, 3.75 mm or more.

As shown in FIG. 12, closing sections 175 configured to close the inner side of the housing 2 are formed in a part of the channels 173 of the hollow body 171. The closing sections 175 are opened on surfaces equivalent to the outer side of the housing 2 and closed on surfaces equivalent to the inner side of the housing 2.

When the exhaust panel 17 is released, the closing sections 175 can be used as a part against which an eject pin is pressed. By using the closing sections 175 in this way, it is easy to release the exhaust panel 17 when the exhaust panel 17 is manufactured by a manufacturing method in which the mold is used. The closing sections 175 are formed on a surface equivalent to the inner side of the housing 2. Therefore, the influence of the closing sections 175 on the exterior of the exhaust panel 17 is small.

As shown in FIG. 13, the closing sections 175 are formed at a fixed interval in the surface of the hollow body 171. Therefore, there is an effect that exhaust is not hindered. For example, the closing sections 175 can be formed in one channel 173 among the channels 173 in twenty places. The hollows corresponding to the closing sections 175 are formed at a fixed interval. Therefore, when the exhaust panel 17 is manufactured by a manufacturing method in which a mold is used, it is possible to provide the hollows in the mold. It is possible to use the hollows as gates for injecting resin.

In this way, the exhaust panel 17 in the second embodiment includes the hollow body 171, which is the hollow body in which the plurality of tubular channels 173 are arrayed. By providing the exhaust panel 17 in the projector 100, an effect that it is possible to easily realize, with a small number of components, a configuration for leading the air discharged from the inside of the housing 2 to a desired direction.

The hollow body 171 is disposed to cover the exhaust port 7a. The respective channels 173 are opened on the outer side and the inner side of the housing 2 in the hollow body 171. In the hollow body 171, an opening ratio of the channels 173 on the inner side of the housing 2 is lower than an opening ratio of the channels 173 on the outer side.

In this way, the hollows corresponding to the closing sections 175 are formed at a fixed interval in the mold of the exhaust panel 17 in this way. Therefore, it is possible to use the hollows as gates. Consequently, it is easy to fill the resin in the mold.

The hollow body 171 includes the closing sections 175 opened on the outer side of the housing 2 and closed on the inner side. In this way, when the exhaust panel 17 is released, the closing sections 175 are used as parts against which the eject pin is pressed. Consequently, it is easy to release the exhaust panel 17.

The hollow body 171 has a honeycomb structure in which the plurality of channels 173 having a hexagonal shape in section are arrayed. Since the hollow body 171 has the honeycomb structure in this way, the resin easily flows into the honeycomb structure formed in the mold of the exhaust panel 17. Therefore, it is easy to mold the hollow body 171, which forms the channels 173, at fixed thickness.

Third Embodiment

Figure 14:
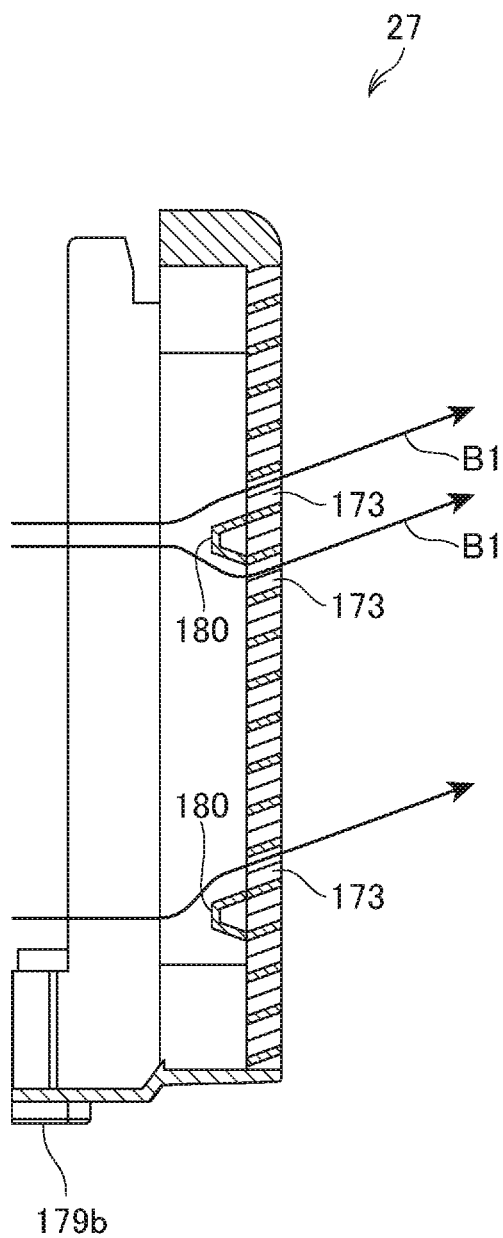
FIG. 14 is a sectional view of an exhaust panel in a third embodiment.

FIG. 14 is a sectional view showing the configuration of an exhaust panel 27 according to a third embodiment. Note that the same portions as the portions in the second embodiment are denoted by the same reference numerals and signs and explanation of the portions is omitted.

As shown in FIG. 14, the exhaust panel 27 includes a plurality of closing sections 180, in which tapers are formed, on the inner side of the housing 2 in the hollow body 171. In this configuration, the air discharged from the inside of the housing 2 to the outside through the exhaust panel 27 easily passes to the channels 173 along the tapers of the closing sections 180. Therefore, it is possible to expect an effect of further improving exhaust efficiency compared with the exhaust panel 17.

Note that the embodiments explained above only indicate forms of the invention. Modifications and applications are optionally possible within the scope of the invention.

For example, the projector 100 explained in the embodiments is explained as the configuration in which the exhaust panel 7 is provided in the exhaust port 7a formed in the right side surface 2C of the housing 2 and the intake panel 6 is provided in the intake port 6a formed in the left side surface 2D. The invention is not limited to this configuration. The positions, the shapes, and the sizes of the intake port 6a and the exhaust port 7a are optional. For example, in a configuration in which the exhaust port 7a is provided as in the projector 100, an opening equivalent to the intake port 6a may be provided in the top surface 2A or the bottom surface 2B or may be provided on the rear surface 2E. An intake port for feeding the outdoor air may have a slit shape. A filter (not shown in the figures) may be provided in the intake port. The positions of the exhaust port 7a and the exhaust panel 7 are not limited to the right side surface 2C. For example, the exhaust port 7a may be provided on the left side surface 2D side. In this case, a configuration may be adopted in which the intake port 6a is provided in the right side surface 2C. A configuration may be adopted in which only the intake port 6a is provided in the right side surface 2C or the left side surface 2D and the exhaust port 7a is provided in the top surface 2A, the bottom surface 2B, or the rear surface 2E.

In the embodiments, the projector 100 that projects the image light from the projection port 8 located substantially in the center in the horizontal direction H toward the rear surface 2E side is explained as the example. However, the invention is not limited to this example. For example, the projector 100 may have a configuration in which the projection port 8 is provided in the rear surface 2E of the housing 2 or at the end portion on the opposite side of the rear surface 2E. Even with such a configuration, it is possible to set the projector 100 in the first and second setting states. The invention can be applied to the configuration.

Note that, when the projector 100 is not the short-focus type and the distance from the projector 100 to the screen SC is relatively long, it is assumed that the user is located between the projector 100 and the screen SC. The inside of the housing 2 is relatively easily seen from the user in this position through the intake panel 6 and the exhaust panel 7. However, the user mainly views the screen SC in the forward direction. Therefore, for the user present in the front (the screen SC side) of the projector 100, a chance of the projector 100 behind the user entering the visual filed of the user is small. The influence thereof is small. The projector 100 in this embodiment is useful because the inside of the housing 2 is less easily seen for the user who simultaneously sees both of the screen SC and the projector 100 in the visual field of the user, that is, the user located behind the projector 100.

In the first and second setting states, the imaginary horizontal plane SP of the projector 100 does not need to be a surface completely parallel to the ceiling surface S1, the floor surface S2, and the other horizontal planes. The other expressions of horizontal, vertical, and parallel explained in the embodiments are not intended to limit the expressions to complete horizontal, vertical, and parallel.

The configuration of the projecting section 10 included in the projector 100 and the detailed configuration such as the shape and the size of the housing 2 can also be optionally changed. The numerical values cited as the specific examples in the embodiments are only examples. The number of the fins 71, the number of the channels 73 and 173, and the like in the exhaust panels 7, 17, and 27 shown in the figures can be optionally changed and only have to be determined as appropriate according to the sizes and the like of the projector 100. The sizes of the angles θ1, θ2, θ3, θ4, θ5, and θ6 can also be optionally adjusted.

Further, a manufacturing method for the intake panel 6 and the exhaust panels 7, 17, and 27 is not limited to the method such as the injection molding in which the mold is used. For example, various methods such as a method of separately manufacturing and joining the fins 71 and the frame 72, shaving, and molding by a 3D printer can be used. The materials of the intake panel 6 and the exhaust panels 7, 17, and 27 are also optional. The other detailed configurations can also be optionally changed.

The entire disclosure of Japanese Patent Application No. 2017-063635, filed Mar. 28, 2017 is expressly incorporated by reference herein.

What is claimed is:

1. A projector for projecting an image on a projection surface, the projector comprising:
    a projecting section configured to project the image in a direction tilted toward an upper side or a lower side with respect to a horizontal direction;
    a housing; and
    a restricting section provided in an opening formed in the housing and configured to restrict a moving direction of air discharged or sucked through the opening, wherein:
    in a projecting direction of the image, the opening is formed on at least one of a left side surface and a right side surface of the housing,
    the restricting section forms a channel that connects an inner side and an outer side of the housing, and
    the channel tilts vertically and horizontally so that, from the inner side toward the outer side, the channel comes closer to a direction vertically opposite to the projecting direction of the image and closer to the projection surface.

2. The projector according to claim 1, wherein the restricting section includes a plurality of planar restricting bodies extending along an extending direction of the channel.

3. The projector according to claim 2, wherein for at least one of the plurality of restricting bodies, thickness on the inner side of the housing and thickness on the outer side of the housing are different.

4. The projector according to claim 1, wherein the restricting section includes a restricting body, which is a hollow body in which a plurality of the channels having a tubular shape are arrayed.

5. The projector according to claim 4, wherein
    the restricting body is disposed to cover the opening,
    the respective channels are opened to one surface side and the other surface side of the restricting body, and
    an opening ratio on one surface side of the restricting body is different from an opening ratio on the other surface side.

6. The projector according to claim 5, wherein the restricting body includes a closing section opened on one surface side of the restricting body and closed on the other surface side.

7. The projector according to claim 4, wherein the restricting body includes a honeycomb structure in which a plurality of the channels having a hexagonal shape in section are arrayed.

8. The projector according to claim 2, wherein at least one of the plurality of restricting bodies includes a surface having opaqueness or a light blocking effect.

9. The projector according to claim 2, wherein
    the restricting section includes a frame attached to the housing, and
    at least one of the plurality of restricting bodies is fixed to the frame.

10. The projector according to claim 2, wherein at least one of the plurality of restricting bodies is integrally formed on a side surface of the housing in which the opening is formed.

11. The projector according to claim 1, further comprising an exhaust device configured to discharge the air in the housing from the opening.

12. A panel attachable to an opening formed in a housing of a projector for projecting an image on a projection surface, wherein:
    a projecting direction of the image is a direction tilted toward an upper side or a lower side with respect to a horizontal direction,
    in a projecting direction of the image, the opening is formed on at least one of a right side surface and a left side surface of the housing,
    in a state in which the panel is attached to the opening, the panel forms a channel that connects an inner side and an outer side of the housing, and
    the channel tilts vertically and horizontally so that, from the inner side toward the outer side, the channel comes closer to a direction vertically opposite to the projecting direction of the image and closer to the projection surface.

13. A projector for projecting an image on a projection surface, the projector comprising:
    a projecting port configured to project the image in a first direction tilted toward an upper side or a lower side with respect to an imaginary horizontal plane, which passes through the projection port and is perpendicular to a direction of gravity;
    a housing; and
    a restricting section provided in an opening formed in the housing and configured to restrict a moving direction of air discharged or sucked through the opening, wherein:
    in a projecting direction of the image, the opening is formed on at least one of a left side surface and a right side surface of the housing,
    the restricting section forms a channel that connects an inner side and an outer side of the housing,
    the channel is tilted such that, in a first sectional view parallel to the imaginary horizontal plane, the moving direction extends horizontally toward the projection surface, and
    the channel is tilted such that, in a second sectional view perpendicular to the first sectional view:
        (1) the moving direction extends upward with respect to the housing when the first direction is tilted toward the lower side with respect to the imaginary horizontal plane, and
        (2) the moving direction extends downward with respect to the housing when the first direction tilts toward the upper side with respect to the imaginary horizontal plane.

* * * * *